United States Patent
Gee et al.

(10) Patent No.: US 8,892,090 B2
(45) Date of Patent: Nov. 18, 2014

(54) SYSTEM FOR PROVIDING VOICE COMMUNICATION

(75) Inventors: Robert Gee, Lake Barrington, IL (US); Shafer Seymour, Bartlett, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 119 days.

(21) Appl. No.: 13/075,370

(22) Filed: Mar. 30, 2011

(65) Prior Publication Data

US 2012/0252431 A1 Oct. 4, 2012

(51) Int. Cl.
| | | |
|---|---|---|
| H04W 4/00 | (2009.01) | |
| H04L 29/08 | (2006.01) | |
| H04W 4/04 | (2009.01) | |
| H04W 4/22 | (2009.01) | |

(52) U.S. Cl.
CPC ............... H04L 67/12 (2013.01); H04W 4/046 (2013.01); H04W 4/22 (2013.01)
USPC ...................... 455/422.1; 455/41.2; 455/575.9

(58) Field of Classification Search
CPC ....................................................... H04W 4/04
USPC ................... 455/41.2, 422.1, 575.9
See application file for complete search history.

(56) References Cited

U.S. PATENT DOCUMENTS

| | | | | |
|---|---|---|---|---|
| 8,320,893 | B2 * | 11/2012 | Suurmeyer et al. | 455/416 |
| 2003/0224840 | A1 | 12/2003 | Frank et al. | |
| 2007/0093200 | A1 * | 4/2007 | Dobosz | 455/3.02 |
| 2011/0143668 | A1 * | 6/2011 | Farrell et al. | 455/41.2 |
| 2012/0231821 | A1 * | 9/2012 | Swanson | 455/466 |

FOREIGN PATENT DOCUMENTS

| | | |
|---|---|---|
| EP | 1494492 A1 | 1/2005 |
| WO | 2008/115214 A1 | 9/2008 |

OTHER PUBLICATIONS

Yilin Zhao, "Telematics: Safe and Fun Driving", IEEE Intelligent Systems, Jan. 1, 2002, pp. 10-14, vol. 17, No. 1, ISSN: 1094-7167, DOI: 10.1109/5254.988442, IEEE Service Center, New York, NY, US.

International Search Report and Written Opinion dated Jun. 4, 2012, from corresponding International Patent Application No. PCT/US2012/023151.

* cited by examiner

Primary Examiner — Amancio Gonzalez

(57) ABSTRACT

A system and method for providing voice communication to an occupant of a vehicle through a mobile device. The system communicates with a mobile device with an occupant of the vehicle, for example using a telematics controller or network access device. The system receives an identification from the mobile device and transmits a request, as well as, the identification to a service provider. The service provider then initiates a communication to the mobile device based on the request and identification.

17 Claims, 4 Drawing Sheets

US 8,892,090 B2

SYSTEM FOR PROVIDING VOICE COMMUNICATION

BACKGROUND

1. Field of the Invention

The present invention generally relates to providing a user of a vehicle voice communication with a service provider through a mobile device.

2. Description of Related Art

Recently, there has been a desire for a low-cost, data-only telematics solution. Such a module may have no voice capability, and may only have power and controller area network (CAN) bus connections to the vehicle. The module could likely include a data-capable network access device (NAD) (e.g., CDMA 1x or GSM GPRS/EDGE) and a vehicle bus interface.

This system could have all of the usual telematics capabilities such as stolen vehicle tracking (SVT), door/window control, remote start, diagnostics, etc., but may not directly have voice capabilities. However in this scenario, the system would lack certain voice related features that are currently available from telematics systems, especially in an emergency call environment.

In view of the foregoing, it is apparent that there is a need for a system that provides voice communication to an occupant of a vehicle through a mobile device.

SUMMARY

A system and method for providing voice communication to an occupant of a vehicle through a mobile device. The system communicates with a mobile device of an occupant in the vehicle, for example using a telematics controller or network access device. The system receives an identification from the mobile device and transmits a request, as well as, the identification to a service provider. The service provider then initiates a communication to the mobile device based on the request and identification.

Since most cars in the future will have Bluetooth or similar capabilities, most of the voice features (if part of the telematics subscription) could be performed via a Bluetooth-connected phone.

Data-only emergency calls may send typical advanced automatic crash notification (AACN) crash data when the vehicle is in an accident. The telematics service provider (TSP) may already have a list of contact numbers with which to contact the owner/drivers of the vehicle (pre-set by the vehicle owner). The list may include, for example, the owner's cell phone number, owner's home phone number, phone number of an emergency contact, etc. This list could be called, in order, by the TSP if emergency notification is received.

The telematics module may receive information about a mobile device that is connected to the telematics controller or another device within the vehicle, and send this information to the service provider either before, after, or during a service request. The TSP uses this information to guide or change how the telematics service is provided.

In one example, a mobile phone may be connected to the vehicle (Bluetooth, USB, etc.) via the head unit. The telematics controller may store the caller ID information (phone number or other identifier) in the telematics system or immediately send the ID information to the TSP. For example, the MSISDN of the phone may be captured and stored or sent to the TSP. When a crash occurs, as part of a data-only stream, the system could send the ID information along with the crash notification. This enhances safety services, since the TSP knows which number to call first, and what may be implied if that number is no longer available. The connection status at the time of the message of one or more of the mobile phones may also be included. The status may include, for example, if a Bluetooth phone was connected before the crash, but is no longer available after the crash.

In addition, a data-only telematics service can now seamlessly merge full voice and data capabilities in the car (like OnStar), using both the network access device (NAD) and a mobile phone. The user may press the B-call button on the telematics control unit, and the telematics service provider (TSP) may call the correct mobile phone number in response.

Further objects, features and advantages of this invention will become readily apparent to persons skilled in the art after a review of the following description, with reference to the drawings and claims that are appended to and form a part of this specification.

DETAILED DESCRIPTION

Figure 1:
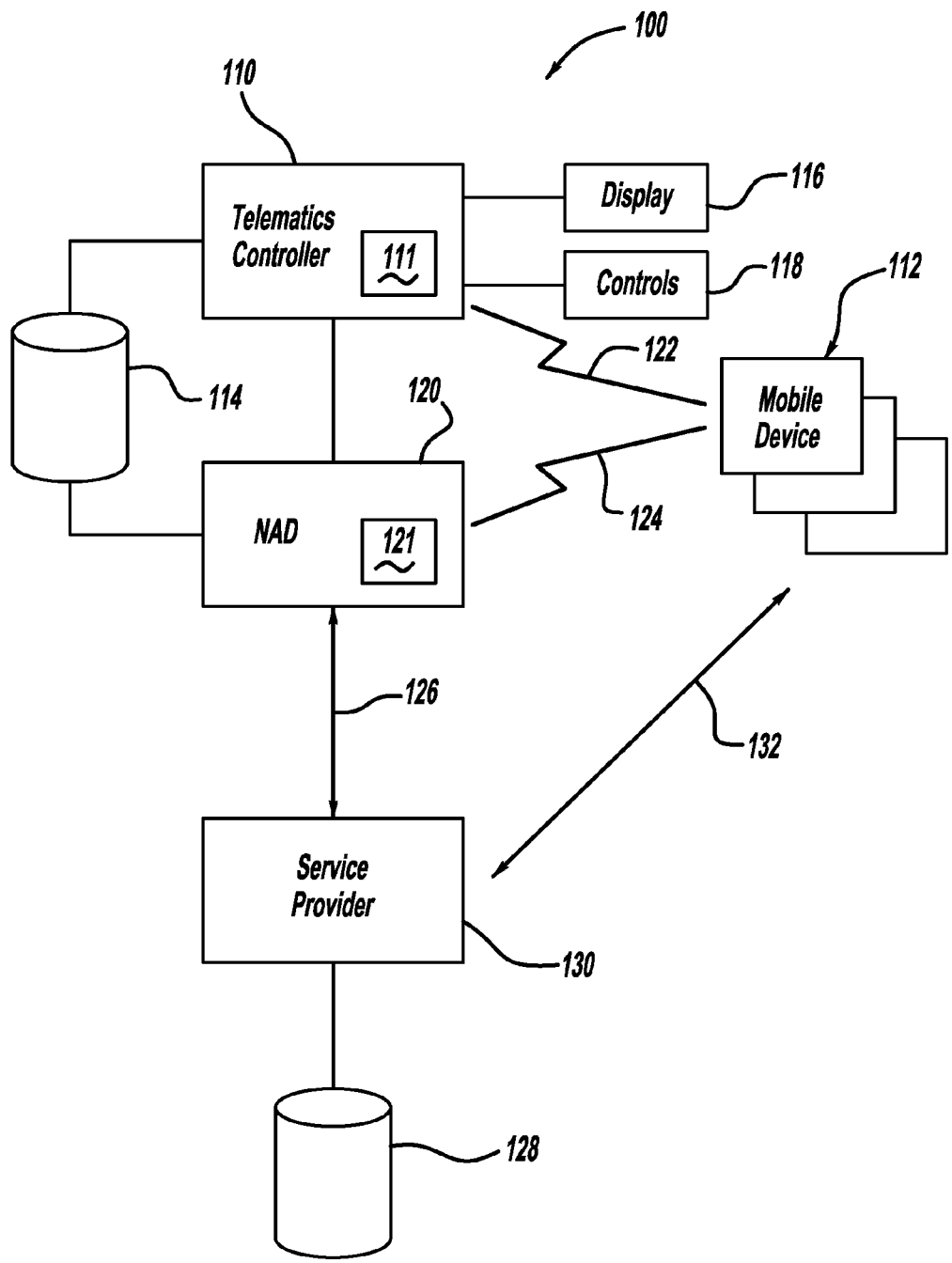
FIG. 1 is a schematic view of system for providing a user of a vehicle voice communication with a service provider through a mobile device

Now referring to FIG. 1, a system 100 is provided for providing profile information to a service provider. The system 100 includes a telematics controller 110 and a network access device 120. The telematics controller 110 is connected to a display 116 and controls 118. The telematics controller 110 may include a transceiver 111 configured to communicate with one or more cellular phones 112 within the vehicle as denoted by line 122. More recently, mobile devices such as cellular phones have been proliferated to the point where each person in the vehicle may be carrying a cellular phone. For example, the driver, the front seat passenger, and a rear passenger may all be carrying a cellular phone. Typically, each cellular phone tends to remain on the person associated with that particular cellular phone. Each cellular phone may include identification information that may be received by the telematics controller 110 over the communication link 122. The information may include an identification number but may also include additional information such as the user's name, the user's address, or other information. Further, the identification information may be stored in a database 114 connected to the telematics controller 110.

The display 116 and controls 118 may allow a user to provide additional profile information that may be associated with each cellular phone and stored in the database 114 with the identification for each cellular phone. Further, the telematics controller 110 may identify when a new (unknown) cellular phone is identified. When the new cellular phone is first connected with the telematics controller 110, the user may be prompted through the display 116 to enter profile information for the user. As such, each set of profile information may be readily accessed based on the identification information or other keys such as the phone number or user name. In addition, the telematics controller 110 may be configured to periodically identify mobile devices such as cellular phones within communication range of the transceiver 111. Further, the telematics controller 110 may store the list of mobile devices 112 within communication with the transceiver 111.

In the same or other implementations, the network access device 120 may include a transceiver 121 that communicates with a mobile device 112 as denoted by line 124. The network access device 120 may operate the transceiver 121 in a similar fashion to the transceiver 111. Some implementations may use a separate transmitter and receiver instead of transceiver 111. In such implementations, the network access device 120 will communicate with the telematics controller 110 to notify the telematics controller when a new mobile device has been identified allowing the telematics controller 110 to prompt the user for the profile information as previously discussed.

In one implementation the communication links 122 and/or 124 may be a Bluetooth communication link. When connected via Bluetooth, a mobile device may support the standard Bluetooth Hands Free Profile (HFP), then the vehicle could use the standard command "AT+CNUM", which is part of the HFP specification, to learn the phone number of the mobile device. This technique may be used to support the scenario in which the vehicle has Bluetooth and the mobile phone is paired with the vehicle. The vehicle also then knows the Bluetooth Device Address associated with the mobile phone, and the Bluetooth Name of the mobile phone. This information can be stored by the vehicle, so that the next time the phone is nearby, the vehicle can detect it and remember the phone number, even without fully establishing a connection.

For the multiple phone scenarios, where the phones are detectable via Bluetooth, the vehicle would need to be paired with the other phones at some point in advance. This way, the vehicle can store the various Bluetooth Device Addresses and associated Bluetooth Names, as well as, the corresponding phone numbers. The vehicle could then use the identifiers to either send the full list of local Bluetooth phones to the TSP, or just a single Bluetooth phone based on priority list. Since the vehicle was previously paired to these mobile devices, it can detect the local Bluetooth Names without fully connecting to those devices.

If the vehicle does not have a connection to the phone, such as over Bluetooth, then the consumer could manually enter the mobile phone number (or calling tree). This could be done in the vehicle through the user interface, or on the TSP servers via web page or other access. Although the vehicle could not detect which phone(s) are present in the vehicle, this would still allow for voice-based telematics services, for example, when using the data-only embedded telematics module in the vehicle.

The following optional approaches can be implemented as well. Potential types and categories of numbers may be configured. A primary voice number may be defined for TSP to call when a telematics service is triggered. If more than one number is provided, the user could define a prioritized list. Prioritization may also be possible by specific day, time, location, or other criteria (e.g., if Monday-Friday, Phone 1 is prioritized; else Phone 2).

The user may also define prioritized phone numbers for other categories such as notification number(s) to call in case of breakdowns, emergencies, etc., as well as, service provider numbers (e.g. vehicle service centers, preferred hospitals, etc.).

Manual entry of mobile phone number(s) may also occur outside of the vehicle. This could be done remotely by the consumer (such as via web page), and sent/stored on either TSP servers or stored by the vehicle. In all cases, there may be multiple numbers entered into the categories above.

Manual entry of mobile phone number(s) may also occur in the vehicle through a user interface. This could be done once, with the vehicle storing the numbers for later use. Further, phone numbers could also be stored on a temporary basis such as use with a rental car, or for a single trip.

The system may automatically detect the primary phone in the vehicle. The primary phone detection may be based on Bluetooth Pairing that was previously done between the vehicle and mobile phone. When vehicle is started, based on priority order, if more than one phone had been paired previously, and which phones are detected, the vehicle can identify the primary voice number. This number can either be sent to the TSP when a telematics service is requested, or sent some time in advance and stored by the TSP.

The system may automatically detect multiple phones in the vehicle. The system may detect each phone in the vehicle base on Bluetooth Pairing that was previously done between the vehicle and mobile phones. When the vehicle is started, vehicle can identify the primary voice number based on a priority order, whether more than one phone had been previously paired, and which phones are detected. Other previously paired phones can be detected, and used to adjust the call lists. For example, if the emergency notification phone is also in the car, the system could select a different phone which is not in the car. The number of the phones can either be sent to the TSP when a telematics service is requested, or sent some time in advance and stored by the TSP.

It should also be understood that the user may enter the preferred mobile calling list (and any associated information) directly onto the TSP servers via web browser or other method. Further, the TSP could use a combination of data sent by the telematics controller and data stored by the TSP. For example, the vehicle may send information about detected mobile phones, which the TSP then uses to compare against the information (number categories, mobile numbers, and any associated information and preferences) that are already stored in the TSP server database. The TSP could then use the information to determine which phone number to call. In one example, the TSP would probably not call a mobile number in the car for a vehicle theft notification; rather, the TSP would likely call a number that is not currently in the car.

The presence of Bluetooth mobile phones may be detected once or multiple times during a drive. If the phones are detected only once, it could be when the car starts, when the vehicle begins moving, or when a telematics service is triggered. If done multiple times, the car could check to see if there is any change to the available devices and adjust the strategy if changes are detected. This is useful if two phones are detected when the car is started, but one person was standing outside the car. When the car drives away, only one phone may then be detected.

The system may also manage phone lists and categories. The preferences and data could be stored and managed on the vehicle. For example, when a telematics service is triggered, the vehicle would send the relevant phone data to the TSP. The preferences and data could also be stored and managed on a server, such as a server controlled by the TSP. For example, the telematics controller could send info about detected phones to the TSP, which then modifies the calling tree accordingly. The telematics controller then does not need to send this information to the TSP when a telematics service is triggered. If there is a collision, and if the detected phones change, then the telematics controller could send the updated information to the TSP.

As such, the telematics controller 110 or the network access device 120 may periodically determine which mobile devices 112 are located within the vehicle and store such information periodically for use in an emergency situation. The network access device 120 may be in communication with a service provider 130, as denoted by line 126. The network communication 126 between the network access device 120 and the service provider 130 is discussed in detail with regard to FIG. 3 and FIG. 4. If the telematics controller 110 detects that a crash condition exits, the telematics controller 110 may communicate with the network access device 120 to initiate an emergency communication to the service provider 130. In such a situation, the telematics controller 110 and/or the network access device 120 may communicate with the mobile devices 112 to determine which mobile devices are still active within a vehicle. The list of which mobile devices are still active may be provided to the service provider 130 along with corresponding profile information for each mobile device that is identified. Further, a list of mobile devices that were active in the time period just previous to the crash condition may also be sent along with the profile information for each of those devices. The difference of whether a device was previously active and is now inactive may indicate the severity of the collision to that occupant or that the occupant is now located outside of the vehicle. The service provider 130 may store the mobile device information along with the corresponding profile information in a database 128. Further as discussed above, the service provider 130 may contact one or more of the mobile devices 112 to provide assistance to the vehicle occupants. The user may prioritize the order of the mobile devices 112 to contact by the service provider 130. Further, the user may provide a list of additional telephone numbers or contact information along with a priority order for the service provider to notify about the crash situation of the vehicle.

Figure 2:
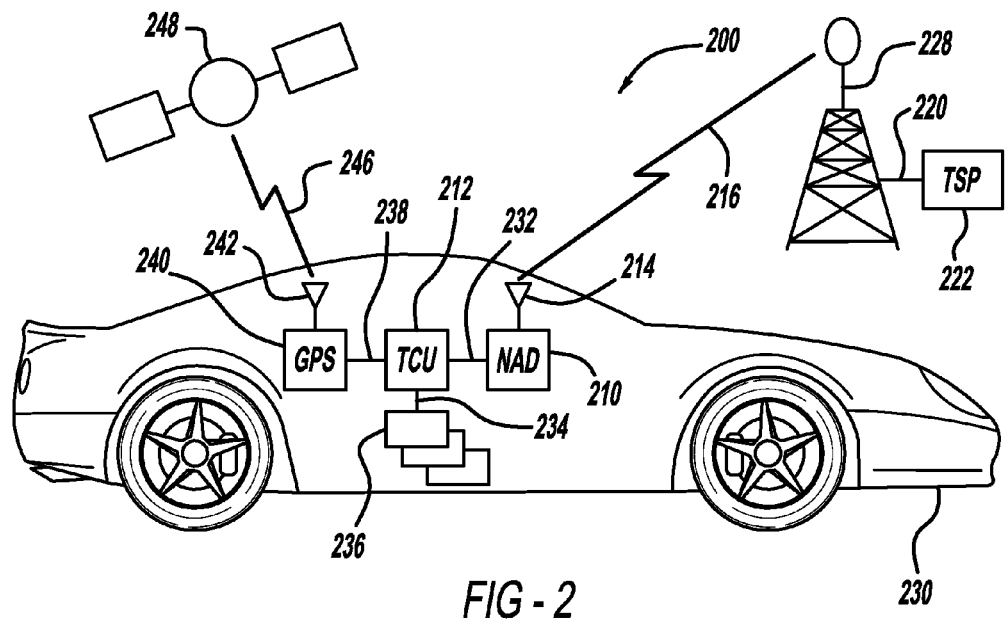
FIG. 2 is a schematic view of a system with a telematics controller and network access device implemented within a motor vehicle.

Now referring to FIG. 2, one possible implementation of the system 200 is provided within a vehicle 230. The network access device 210 may be provided in the same or a separate package from the telematics controller 212. The network access device 210 may be connected to an antenna 214. The antenna 214 may be representative of a plurality of antennas or a matrix of antennas depending upon the particular communication mode selected. Communication of the network access device 210 is facilitated with a remote station 228, as denoted by line 216. As described previously, the remote station 228 may be in communication with a service provider 222 including a network server through a network 220. The telematics controller 212 may be in communication with a global positioning device 240 over the vehicle bus or a custom connection as denoted by line 238. The global positioning device 240, such as a satellite global positioning system (GPS), may be in communication with an antenna 242. The antenna 242 may be one of a plurality of antennas or a matrix of antennas. Further, the antenna or plurality of antennas represented by reference number 242 may be the same antennas, as denoted by reference number 214. The GPS unit may be in communication with a set of GPS satellites as shown by the exemplar 248, and denoted by line 246. As such, the GPS unit 240 may retrieve positional data for the vehicle or in other implementations 240 may also represent a general satellite receiver and, therefore, may receive other general broadcast information or communication from the satellite 248. The telematics controller 212 may also be in communication with various other vehicle devices and systems through the vehicle bus, wire harnesses, or other wireless connections, as denoted by line 234. The various other devices 236 may include but are not limited to the engine control system, the vehicle locks, the vehicle safety systems (e.g. seatbelt retractors, airbags, etc.), vehicle entertainment system, or a suspension control system.

Figure 3:
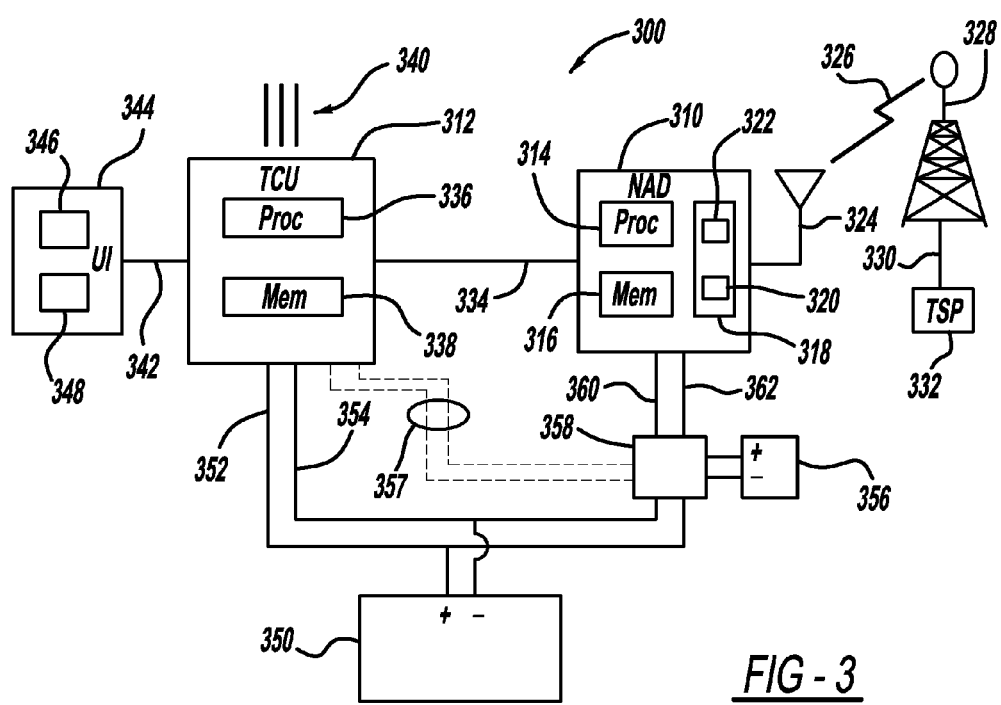
FIG. 3 is a schematic view of a system including a telematics controller and a network access device.

Now referring to FIG. 3, a system 300 is provided. The system includes a network access device 310 and a telematics controller 312. The network access device 310 may include a processor 314 and storage 316. The processor 314 may be a programmable microprocessor or alternatively may be an application specific integrated circuit (ASIC), or other known processor. The storage 316 may be a memory, for example, random access memory, static memory, or other data storage device. The network access device 310 may also include a transceiver 318 which includes a transmitter 322 and a receiver 320. Alternatively, the network access device 310 may include an independent transmitter and receiver. The transceiver 318 may be in communication with an antenna 324. The transceiver 318 may communicate with a radio tower 328 as denoted by line 326. The communication 326 between the network access device 310 and the radio tower 328 may comprise one of a plurality of communication modes.

The transceiver 318 in the network access device 310 may be used for transmitting uplink communications and receiving downlink communication to and from the network 330 and service center 332 over the wireless communication link 326. The wireless communication link 326 may use a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). Further, standard transmission control protocol/internet protocol (TCP/IP) may also be used as well as satellite communications. In a further example, the transceiver 318 may be enabled using other wireless technologies such as Bluetooth technology. Bluetooth technology allows for the replacement of a wired connection by enabling devices to communicate with each other through a universal short-range radio link.

The radio tower 328 may be in communication with a service provider 332 including for example, a network server through a network 330. Network 330 may be an analog network such as a plain old telephone service (POTS) or a digital network for example, Ethernet over transmission control protocol/internet protocol (TCP/IP). In other examples, the network 330 could be one of several standard cellular communication networks, a satellite-based network, a public switched telecommunication network (PSTN), the Internet, an integrated services digital network (ISDN), and/or other communication networks. The service provider may include a service center to provide telematics applications and services to the vehicle. For instance, the service center may contain operators, content servers and content databases. The content servers for telematics applications and services may include traffic servers, map servers, user profile servers, location information servers, and the like. The content databases for telematics applications and services may include location information, user profiles, traffic content, map content, point-of-interest content, usage history, and the like.

The network access device 310 may be in communication with the telematics controller 312 through a communication interface 334. In some implementations the network access device 310 may be in the same package as the telematics controller 312. However, other implementations the network access device 310 may be provided in a separate package from the package of the telematics controller 312 and, therefore, may be located in a different area of the vehicle. Various information may be communicated between the telematics controller 312 and the network access device 310.

The telematics controller 312 may include a processor 336 and storage 338. The processor 336 may be a microprocessor, an application specific integrated circuit, a programmable gate array, or other processor. Further, the storage 338 may be a memory device for example, random access memory, read only memory, static memory, or may even be a hard drive or optical drive, or other means of data storage. The telematics controller 312 may be in communication with a plurality of other vehicle sensors and devices through a wire harness or over the vehicle bus as denoted by lines 340. In addition, the telematics controller 312 may be in communication with a user interface 344 as denoted by line 342. The user interface 344 may include a display 346 and controls 348 for providing user input such as vehicle parameters into the telematics controller 312. Also, the user interface 344 may include elements such as a keyboard or keypad, one or more control buttons, indicator lights, one or more speakers, a microphone, and any other user interface type elements for telematics applications and services. Optionally, the telematics controller 312 may also be connected to a positioning unit. The positioning unit could be a system that determines the geographic location of the vehicle such as a global positioning system (GPS), a dead-reckoning system, and the like.

Further, the telematics controller 312 may be in communication with other vehicle systems, such as the engine control system, the vehicle lock controls, the vehicle safety systems (e.g. seatbelt retractors, airbags, etc.), vehicle entertainment system, or a suspension control system to implement the described functions of the telematics controller 312 or network access device 310 based on parameters of such systems.

The telematics controller 312 may be powered by the vehicle battery 350 as denoted by lines 352 and 354. Alternatively, a voltage converter may be provided to convert from the vehicle battery voltage to a different voltage that may be appropriate for running the telematics controller 312. The voltage converter may be included in the package for the telematics controller 312 or alternatively may be in a separate package between the vehicle battery 350 and the telematics controller 312. The vehicle battery 350 may also provide power to the network access device 310.

A circuit 358 may be included between the vehicle battery 350 and the network access device 310. The circuit 358 may include a voltage converter to change the voltage provided to the network access device 310 in lines 360 and 362. In addition, the circuit 358 may be connected to a network access device battery 356. The network access device battery 356 may be charged while the vehicle is running and may for example, be switched to provide power to the network access device 310 when power from the vehicle power system (e.g., the battery or alternator) is not available. Further, the circuit 358 may control the monitoring and periodic powering of the network access device if the vehicle is turned off for a long period of time. Further, the circuit 358 may control the charging of the network access device battery 356 at appropriate times according to the environmental variables or the expected use cycle of the vehicle. In addition, it is possible for network access device battery 356 to be switched to provide power to the network access device 310 and also to the telematics controller 312, as denoted by lines 357. In one example, this secondary battery could be switched to provide power to the network access device 310 alone, or alternatively to both the network access device 310 and telematics controller 312 at the same time.

Figure 4:
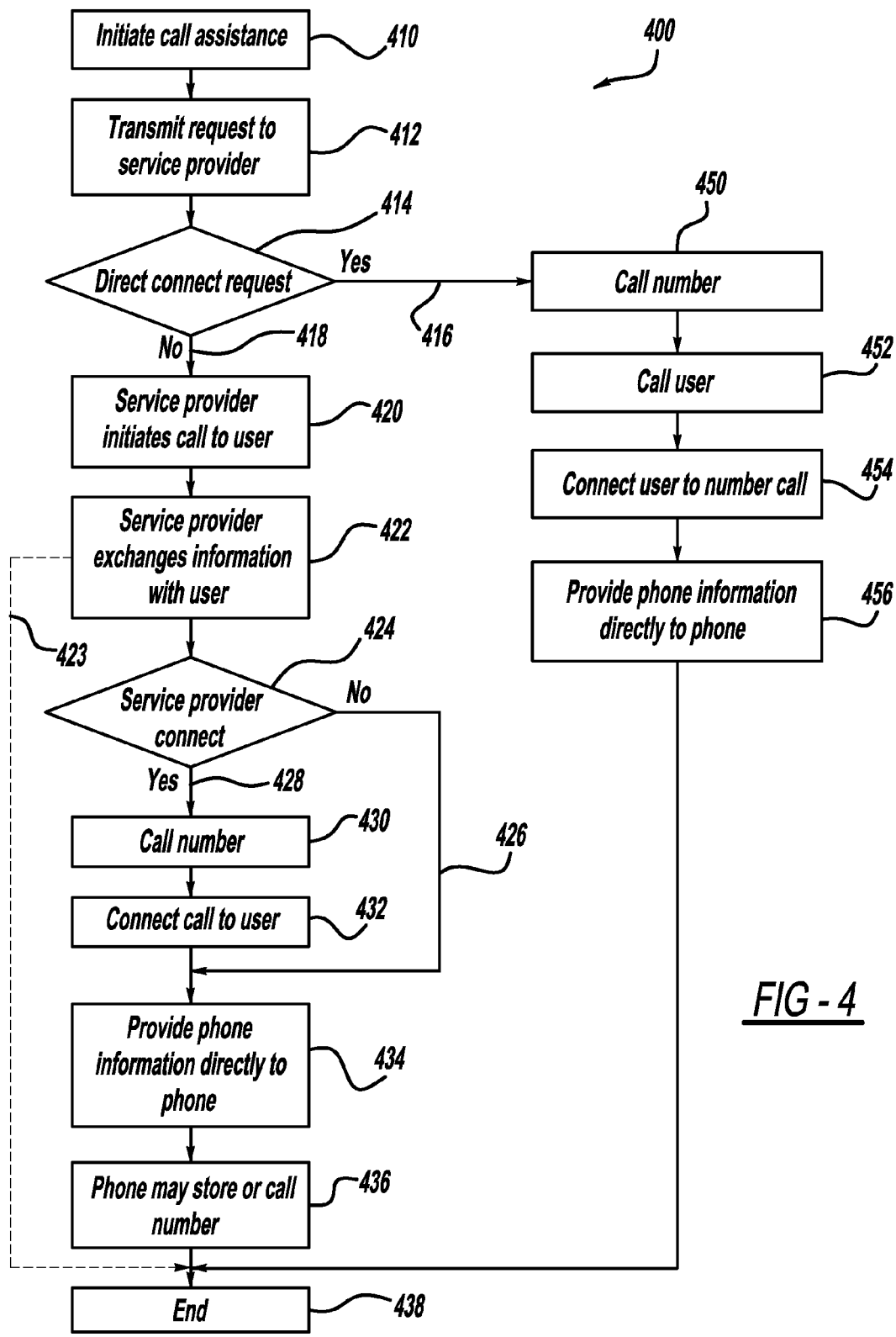
FIG. 4 is a flowchart illustrating a call assistance function of a system.

Now referring to FIG. 4, a method for call assistance is provided. The method 400 begins in block 410 where the user initiates call assistance. The user may initiate call assistance by pressing a button on the user interface or alternatively by selecting a menu selection from a display. However, it is also understood that the vehicle could initiate call assistance, for example, in an emergency call scenario, such as if the telematics controller determines a crash condition occurs. In block 412, the system transmits the call assistance request to the service provider. The request may include the identification of a phone that is currently active within the vehicle. The telematics controller may determine which phones are active based on a Bluetooth connection with the device and/or may provide the user with a prioritized list to select the phone that the user wishes to call.

In block 414, the system determines if the request indicates direct connect request. In this instance, the request may include a phone number or profile that the user wishes to contact. If the request indicates a direct connect request, the method may follow line 416 to block 450. In block 450, the phone number or profile indicated in the request is contacted. In block 452, a call is initiated to the user using the identification provided in the request for the active phone within the vehicle. In block 454, the call to the phone number or profile from block 450 and the call to the user from block 452 are connected. In block 456, the phone number or profile information may be provided directly to the active phone in the vehicle for future use, for example by SMS text. The method then proceeds to block 438 where the method ends.

Referring again to block 414, if the request is not a direct connect request the method follows line 418 to block 420. In this scenario, the request may indicate an operator assisted call. The service provider then initiates a call with the user, as denoted by block 420. In block 422, the service provider connects the user with an operator and the operator receives verbal information from the user, such as the phone number, the name of the person, or the name of the business to call. In block 424, the operator may decide to connect the call based on a preference of the user. If the call is not connected by the operator, the method follows line 426 to block 434. If the call is connected by the operator, the method follows line 428 to block 430. Although it should noted that between steps 422 and 424, it may also be an option to end the service as denoted by line 423. For example, if the user contacts the service center just to check the hours of a restaurant, then the service center can provide this information at step 422 while talking directly to the user; the service could then be ended.

In block 430, the number or profile is contacted based on the verbal information provided to the operator by the user. Once a call is established to the number or profile, the call from block 430 is connected to the call to the user from block 420, as denoted by block 432. The phone number or directory information may be provided directly to the phone, for example by an SMS text, as denoted by block 434. The user may then store the store or use the information that was transmitted to the phone in block 434 to directly call the phone number or profile as indicated in block 436. Again, the method ends at block 438.

Figure 5:
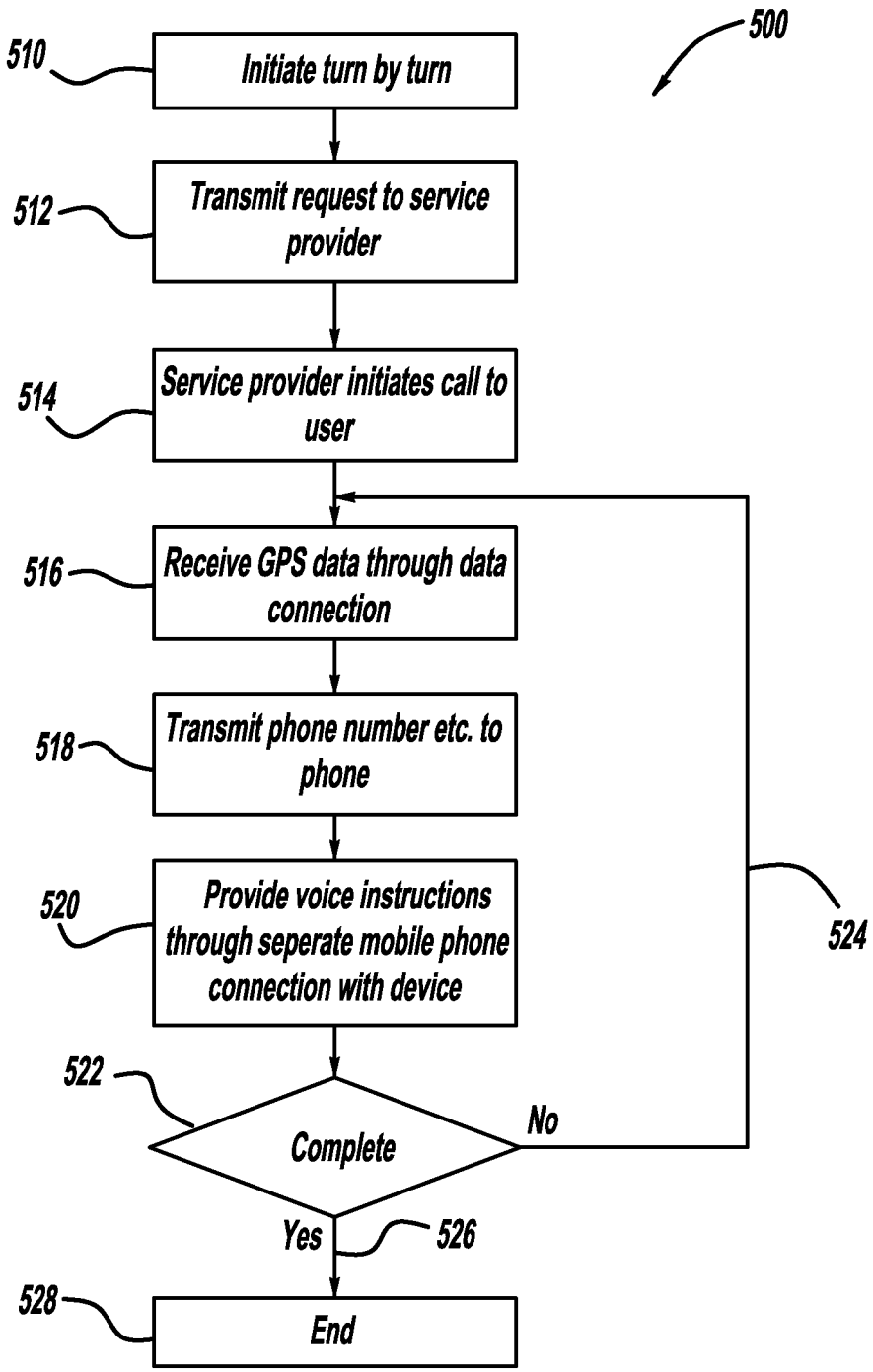
FIG. 5 is a flowchart illustrating a turn by turn navigation function of a system.

Now referring to FIG. 5, the method 500 starts in block 510, where the user initiates a turn by turn function using the user interface of the telematics controller. In block 512, a request is transmitted to the service provider indicating that the user requests a turn by turn direction. In block 514, the service provider initiates a call to the user using the identification provided in the request. An operator may then request the destination information from the user. However, the destination information could be selected by the user from a user interface and transmitted to the service provider with the request. In block 516, the service provider receives GPS data through a data connection from the network access device on the vehicle.

In block 518, the service provider may transmit the phone number and information about the location to the active phone in the vehicle based on the identification for the mobile device. The information may include information include the phone number, business hours, menu, web site, or other such information for the destination. In one example, the information may be sent by SMS text or email. In block 520, the user provider may provide voice instructions through the cellular phone connection initiated by the service provider. In block 522, it is determined if the directions have been completed. If the directions have not been completed, the method follows line 524 to block 516 where additional GPS data is received and further directions are provided. Referring again to block 522, if the directions are complete, the method follows line 526 to block 528 where the method ends.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

We claim:

1. A system for a vehicle to provide notice of the occurrence of a predetermined event, the system comprising:

a user interface in the vehicle, the user interface comprising a display and controls;

a telematics controller coupled to the user interface, the telematics controller being configured to receive at least one phone number and to receive a calling criteria specific to that phone number from the user interface, the at least one phone number to be contacted by a telematics service provider on the occurrence of the predetermined event and in accordance with the calling criteria, the at least one phone number to be called and the calling criteria, being manually entered into the user interface;

a first cellular network access device coupled to the telematics controller and having a transceiver configured to be able to communicate data with the telematics service provider over a cellular wireless network wherein the first cellular network access device is additionally configured to be able to transmit a first data message to the service provider through the transceiver, the first data message comprising the at least one phone number, and the calling criteria associated with that phone number.

2. The system according to claim 1, wherein the first phone number is at least one of: a cellular number; a home phone number; and the phone number of an emergency contact; and wherein the first cellular network access device is additionally configured to transmit the first data message upon the occurrence of a vehicle collision, said first data message being configured cause the service provider to initiate a first phone call from the service provider to a first phone number received at the user interface.

3. The system according to claim 1, wherein the calling criteria is at least one of: a day of the week and a time of day for a call to be placed to a phone number entered at the user interface; a priority in the calling list of multiple phone numbers; a type of contact wherein a type of contact is at least one of: short message service; e-mail, an instant message, and a voice call; and substitution of a specific number to be contacted if one or more of specific other numbers in the list are not successfully contacted.

4. The system according to claim 1, wherein the predetermined event is a vehicle collision and wherein the first data message contains a set of phone numbers, which is selected from a plurality of different sets of phone numbers responsive to an identifier of a second cellular access device that is located within the vehicle, said identifier for the second cellular access device being provided to the telematics controller prior to transmission of the first data message.

5. The system according to claim 4, wherein the identifier of the second cellular access device is provided to the telematics controller wirelessly.

6. The system according to claim 4, wherein the telematics service provider is configured to automatically place a first call to a first number received at the user interface, place a second call to the second cellular network access device, and connect the first call and the second call together.

7. The system according to claim 4, wherein the telematics service provider is configured to place a first call to the second cellular network access device and connect the first call with an operator.

8. The system according to claim 1, wherein the telematics controller is configured to automatically transmit at least one phone number and calling criteria received at the user interface to the telematics service provider, prior to the occurrence of the predetermined event, and wherein the telematics service provider stores the at least one phone number and calling criteria for use upon receipt of a second data message, which is transmitted by the first cellular network access device on the occurrence of the predetermined event.

9. The system according to claim 1, wherein the telematics service provider is configured to automatically transmit a phone number to a second cellular network access device that is in the vehicle, via simple message service.

10. The system according to claim 1, wherein the predetermined event is a service request.

11. A system for a vehicle to provide notice of the occurrence of a predetermined event, the system comprising:
   a mobile phone in the vehicle having mobile phone-identifying data and configured to be able to provide voice communications using a wireless cellular communications technology;
   a user interface coupled to the vehicle and comprising a display and controls, the user interface being configured to manually receive phone numbers to be contacted by a telematics service provider in addition to calling criteria for each phone number, on the occurrence of the predetermined event;
   a telematics controller coupled to the user interface the telematics controller being configured to receive the mobile phone-identifying data and configured to receive a plurality of phone numbers and calling criteria for each phone number from the user interface, the phone numbers and calling criteria received from the user interface being formed into an ordered list of phone numbers, the phone numbers on the list to be contacted by a telematics service provider according to their order on the list and the additional calling criteria, on the occurrence of the predetermined event, different phone numbers on the ordered list being additionally determined and contacted in their order on the list responsive to mobile phone-identifying data received from the mobile phone;
   a first cellular network access device coupled to the telematics controller and having a transceiver configured to provide data communications with a telematics service provider using said wireless cellular communications technology, wherein the first cellular network access device is configured to provide said mobile phone-identifying data and provide the ordered list of phone numbers and calling criteria for each phone number to the telematics service provider, by the transmission of a data message transmitted from the transceiver.

12. The system according to claim 11, wherein mobile phone-identifying data is received wirelessly and wherein the telematics service provider is configured to automatically place a first call to a first phone number on the list responsive to receipt of a first mobile phone-identifying data and place a first call to a different phone number on the list responsive to receipt of a second mobile phone-identifying data.

13. The system according to claim 11, wherein the telematics service provider is configured to place a call to a first phone number on the list responsive to receipt of a first mobile phone-identifying data and place a second call to the mobile device in the vehicle and connect the call that was placed to the first phone number to the mobile device in the vehicle.

14. The system according to claim 11, wherein the telematics service provider is configured to receive global positioning data via the transceiver and provide voice directions to a user of the mobile device in the vehicle.

15. A method for a vehicle to provide notice of the occurrence of a predetermined event, by the transmission of a data message to a telematics service provider, the data message being transmitted by a transceiver coupled to the vehicle, the method comprising:
   receiving mobile device identification data, said mobile device identification data identifying a first mobile device in the vehicle;
   receiving a plurality of phone numbers and calling criteria for each phone number through a user interface in the vehicle, the plurality of phone numbers comprising at least one of: a cellular phone number; a home phone number; and the phone number of an emergency contact;
   transmitting the mobile device identification data and transmitting the plurality of phone numbers and calling criteria to the telematics service provider using a data message transmitted by said transceiver coupled to the vehicle;
   transmitting from the transceiver, a message comprising notice of the occurrence of the predetermined event, the transmission of the notice causing the telematics service provider to begin calling a first set of phone numbers that were transmitted to the telematics service provider in a predetermined order and according to the additional calling criteria, the first set of numbers being selected from all of the phone numbers received responsive to the mobile device identification data.

16. The method according to claim 15, further comprising:
   selecting a a first phone number and calling criteria from a menu on the user interface;
   transmitting the first phone number and calling criteria to the telematics service provider;
   receiving a first call from the telematics service provider, at the first phone number;
   receiving a second call from the telematics service provider at a mobile device in the vehicle; and
   connecting the first and second call at the telematics service provider.

17. In a non-transitory computer readable storage medium having stored therein instructions executable by a programmed processor for providing notice of the occurrence of a predetermined event by a vehicle, the storage medium comprising instructions for:
   receiving mobile cellular device identification data, phone numbers, and calling criteria for each phone number from a user interface coupled to a network access device that is attached to the vehicle, the mobile cellular device identification data identifying a user's mobile cellular communications device;
   transmitting the mobile cellular device identification data, the phone numbers, and the calling criteria from the vehicle to a telematics service provider using a vehicle wireless communications device, which is configured to transmit data using a cellular wireless communications technology;
   transmitting to the telematics service provider from the vehicle's wireless communications device, data comprising notice of the occurrence of the predetermined event; and
   receiving a call at one of the phone numbers provided to the telematics service provider, the call received at the one of the phone numbers being placed by the telematics service provider responsive to transmission of the data comprising notice of the occurrence of the predetermined event and the calling criteria.

* * * * *